(12) United States Patent
Kim et al.

(10) Patent No.: US 10,643,085 B1
(45) Date of Patent: May 5, 2020

(54) METHOD AND DEVICE FOR ESTIMATING HEIGHT AND WEIGHT OF PASSENGERS USING BODY PART LENGTH AND FACE INFORMATION BASED ON HUMAN'S STATUS RECOGNITION

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/731,073

(22) Filed: Dec. 31, 2019

Related U.S. Application Data

(60) Provisional application No. 62/798,575, filed on Jan. 30, 2019.

(51) Int. Cl.
*G06K 9/00* (2006.01)
*G06T 7/62* (2017.01)
*G06K 9/62* (2006.01)

(52) U.S. Cl.
CPC ..... *G06K 9/00832* (2013.01); *G06K 9/00228* (2013.01); *G06K 9/00288* (2013.01);
(Continued)

(58) Field of Classification Search
CPC ............ G06T 7/62; G06T 2207/20076; G06T 2207/20081; G06T 2207/30201;
(Continued)

(56) References Cited

U.S. PATENT DOCUMENTS

10,268,908 B2 * 4/2019 Park .................... G06K 9/00805
10,358,104 B2 * 7/2019 Chen ........................ B60R 21/16
(Continued)

*Primary Examiner* — Shefali D Goradia
(74) *Attorney, Agent, or Firm* — Xsensus LLP (57) ABSTRACT

A method for detecting body information on passengers of a vehicle based on humans' status recognition is provided. The method includes steps of: a passenger body information-detecting device, (a) inputting an interior image of the vehicle into a face recognition network, to detect faces of the passengers and output passenger feature information, and inputting the interior image into a body recognition network, to detect bodies and output body-part length information; and (b) retrieving specific height mapping information by referring to a height mapping table of ratios of segment body portions of human groups to heights per the human groups, acquiring a specific height of the specific passenger, retrieving specific weight mapping information from a weight mapping table of correlations between the heights and weights per the human groups, and acquiring a weight of the specific passenger by referring to the specific height.

18 Claims, 6 Drawing Sheets

(52) U.S. Cl.
CPC ....... *G06K 9/00362* (2013.01); *G06K 9/6232* (2013.01); *G06K 9/6262* (2013.01); *G06T 7/62* (2017.01); *G06T 2207/20076* (2013.01); *G06T 2207/20081* (2013.01); *G06T 2207/30201* (2013.01); *G06T 2207/30268* (2013.01)

(58) Field of Classification Search
CPC ...... G06T 2207/30268; G06K 9/00228; G06K 9/00288; G06K 9/00362; G06K 9/6232; G06K 9/6262; G06K 9/00832
See application file for complete search history.

(56) References Cited

U.S. PATENT DOCUMENTS

| | | | |
|---|---|---|---|
| 2008/0036580 A1* | 2/2008 | Breed | B60J 7/0573 340/438 |
| 2018/0074494 A1* | 3/2018 | Myers | H04W 4/029 |

* cited by examiner

METHOD AND DEVICE FOR ESTIMATING HEIGHT AND WEIGHT OF PASSENGERS USING BODY PART LENGTH AND FACE INFORMATION BASED ON HUMAN'S STATUS RECOGNITION

CROSS REFERENCE TO RELATED APPLICATION

This application claims the benefit of priority to U.S. Provisional Patent Application No. 62/798,575, filed on Jan. 30, 2019, the entire contents of which being incorporated herein by reference.

FIELD OF THE DISCLOSURE

The present disclosure relates to a method and a device for detecting heights and weights of passengers of a vehicle using face recognition and body-part lengths of the passengers; and more particularly, to the method for detecting the body-part lengths of the passengers from an interior image acquired from a camera, detecting feature information on the passengers from face information of the passengers using the interior image, and detecting the heights and the weights of the passengers by referring to the feature information and the body-part lengths corresponding to each of the passengers, and the device using the same.

BACKGROUND OF THE DISCLOSURE

Generally, passenger seats are provided in a passenger compartment of a vehicle. A driver's seat or passengers' seats may be related to various passenger-detecting devices capable of identifying a type of a passenger when the passenger is seated, determining a presence or an absence of the passenger, and indicating whether the seat belt is worn.

Among them, a pattern recognition system, a pressure recognition system, and a weight recognition system are most widely used. In the pattern recognition system, a sensor mat is provided in a seat of the vehicle, and pressure sensors are arranged in a matrix form on the sensor mat, and the passenger is detected and identified by recognizing a weight and a pelvic pattern of the passenger seated in the seat.

In the pressure recognition system, a thin bladder and pressure sensors are arranged on a lower side of a seat cushion. When the passenger is seated, the pressure sensors sense the liquid flowing out of the bladder and thus the passenger is detected and identified.

In the weight recognition system, a strain gauge sensor is arranged at a position where a seat frame inside a seat is mounted. Then the weight of the passenger is detected and thus the passenger is detected and identified.

However, even if a variety of the passenger-detecting devices are provided as described above, various detection errors occur. For example, if the passenger is seated on one side of the seat or not seated properly, the passenger-detecting devices determine that no passenger is seated, or if an underweight adult is seated, the devices may identify the passenger as a child.

If the adult passenger is mistakenly identified as a child due to such an error, then when a car accident occurs, an airbag is deployed so as to correspond to the shape of the child which is not safe for an adult, resulting in a secondary injury.

Further, if the passenger is detected as not seated, many problems arise due to an error in identification of the passenger, for example, the passenger may suffer a serious injury because the airbag is not deployed.

In addition to this, since a sensor is required for every seat of the vehicle, not only the cost is increased, but also the information to be processed is increased, and therefore the processing speed is reduced.

Also, while the vehicle is driven, weights of the passengers may be measured incorrectly if the vehicle rolls or bounces.

Accordingly, the inventors of the present disclosure propose a method for measuring the heights and the weights of the passengers at a lower cost than conventional methods.

SUMMARY OF THE DISCLOSURE

It is an object of the present disclosure to solve all the aforementioned problems.

It is another object of the present disclosure to measure at least one height and at least one weight of at least one passenger of a vehicle without an increase in cost.

It is still another object of the present disclosure to measure the height and the weight of the passenger without regard to a driving environment.

It is still yet another object of the present disclosure to measure the height and the weight of the passenger, minimizing information to process.

In accordance with one aspect of the present disclosure, there is provided a method for detecting body information on one or more passengers of a vehicle based on humans' status recognition, including steps of: (a) if at least one interior image of an interior of the vehicle is acquired, a passenger body information-detecting device performing (i) a process of inputting the interior image into a face recognition network, to thereby allow the face recognition network to detect each of faces of each of the passengers from the interior image, and thus to output multiple pieces of passenger feature information corresponding to each of the detected faces, and (ii) a process of inputting the interior image into a body recognition network, to thereby allow the body recognition network to detect each of bodies of each of the passengers from the interior image, and thus to output body-part length information of each of the detected bodies; and (b) the passenger body information-detecting device performing a process of retrieving specific height mapping information corresponding to specific passenger feature information on a specific passenger from a height mapping table which stores height mapping information representing respective one or more predetermined ratios of one or more segment body portions of each of human groups to each of heights per each of the human groups, a process of acquiring a specific height of the specific passenger from the specific height mapping information by referring to specific body-part length information of the specific passenger, a process of retrieving specific weight mapping information corresponding to the specific passenger feature information from a weight mapping table which stores multiple pieces of weight mapping information representing predetermined correlations between each of the heights and each of weights per each of the human groups, and a process of acquiring a weight of the specific passenger from the specific weight mapping information by referring to the specific height of the specific passenger.

As one example, at the step of (a), the passenger body information-detecting device performs a process of inputting the interior image into the body recognition network, to thereby allow the body recognition network to (i) output one or more feature tensors with one or more channels corresponding to the interior image via a feature extraction network, (ii) generate at least one keypoint heatmap and at least one part affinity field with one or more channels corresponding to each of the feature tensors via a keypoint heatmap & part affinity field extractor, and (iii) extract keypoints from the keypoint heatmap via a keypoint detector, to group the extracted keypoints by referring to the part affinity field, and thus to generate body parts per the passengers, and as a result, allow the body recognition network to output multiple pieces of body-part length information on each of the passengers by referring to the body parts per the passengers.

As one example, the feature extraction network includes at least one convolutional layer and applies at least one convolution operation to the interior image, to thereby output the feature tensors.

As one example, the keypoint heatmap & part affinity field extractor includes one of a fully convolutional network and a 1×1 convolutional layer, and applies a fully-convolution operation or 1×1 convolution operation to the feature tensors, to thereby generate the keypoint heatmap and the part affinity field.

As one example, the keypoint detector connects, by referring to the part affinity field, pairs respectively having highest mutual connection probabilities of being connected among the extracted keypoints, to thereby group the extracted keypoints.

As one example, the feature extraction network and the keypoint heatmap & part affinity field extractor have been learned by a learning device performing (i) a process of inputting at least one training image including one or more objects for training into the feature extraction network, to thereby allow the feature extraction network to generate one or more feature tensors for training having one or more channels by applying at least one convolutional operation to the training image, (ii) a process of inputting the feature tensors for training into the keypoint heatmap & part affinity field extractor, to thereby allow the keypoint heatmap & part affinity field extractor to generate one or more keypoint heatmaps for training and one or more part affinity fields for training having one or more channels for each of the feature tensors for training, (iii) a process of inputting the keypoint heatmaps for training and the part affinity fields for training into the keypoint detector, to thereby allow the keypoint detector to extract keypoints for training from each of the keypoint heatmaps for training and a process of grouping the extracted keypoints for training by referring to each of the part affinity fields for training, to thereby detect keypoints per each of the objects for training, and (iv) a process of allowing a loss layer to calculate one or more losses by referring to the keypoints per each of the objects for training and their corresponding ground truths, to thereby adjust one or more parameters of the feature extraction network and the keypoint heatmap & part affinity field extractor such that the losses are minimized by backpropagation using the losses.

As one example, at the step of (a), the passenger body information-detecting device performs a process of inputting the interior image into the face recognition network, to thereby allow the face recognition network to detect each of the faces of each of the passengers located in the interior image via a face detector, and to output multiple pieces of the passenger feature information on each of the facial images via a facial feature classifier.

As one example, at the step of (a), the passenger body information-detecting device performs a process of inputting the interior image into the face recognition network, to thereby allow the face recognition network to (i) apply at least one convolution operation to the interior image and thus to output at least one feature map corresponding to the interior image via at least one convolutional layer, (ii) output one or more proposal boxes, where the passengers are estimated as located, on the feature map, via a region proposal network, (iii) apply pooling operation to one or more regions, corresponding to the proposal boxes, on the feature map and thus to output at least one feature vector via a pooling layer, and (iv) apply fully-connected operation to the feature vector, and thus to output the multiple pieces of the passenger feature information corresponding to each of the faces of each of the passengers corresponding to each of the proposal boxes via a fully connected layer.

As one example, the multiple pieces of the passenger feature information include each of ages, each of genders and each of races corresponding to each of the passengers.

In accordance with another aspect of the present disclosure, there is provided a passenger body information-detecting device for detecting body information on one or more passengers of a vehicle based on humans' status recognition including: at least one memory that stores instructions; and at least one processor configured to execute the instructions to perform or support another device to perform: (I) if at least one interior image of an interior of the vehicle is acquired, (i) a process of inputting the interior image into a face recognition network, to thereby allow the face recognition network to detect each of faces of each of the passengers from the interior image, and thus to output multiple pieces of passenger feature information corresponding to each of the detected faces, and (ii) a process of inputting the interior image into a body recognition network, to thereby allow the body recognition network to detect each of bodies of each of the passengers from the interior image, and thus to output body-part length information of each of the detected bodies, and (II) a process of retrieving specific height mapping information corresponding to specific passenger feature information on a specific passenger from a height mapping table which stores height mapping information representing respective one or more predetermined ratios of one or more segment body portions of each of human groups to each of heights per each of the human groups, a process of acquiring a specific height of the specific passenger from the specific height mapping information by referring to specific body-part length information of the specific passenger, a process of retrieving specific weight mapping information corresponding to the specific passenger feature information from a weight mapping table which stores multiple pieces of weight mapping information representing predetermined correlations between each of the heights and each of weights per each of the human groups, and a process of acquiring a weight of the specific passenger from the specific weight mapping information by referring to the specific height of the specific passenger.

As one example, at the process of (I), the processor performs a process of inputting the interior image into the body recognition network, to thereby allow the body recognition network to (i) output one or more feature tensors with one or more channels corresponding to the interior image via a feature extraction network, (ii) generate at least one keypoint heatmap and at least one part affinity field with one or more channels corresponding to each of the feature tensors via a keypoint heatmap & part affinity field extractor, and (iii) extract keypoints from the keypoint heatmap via a keypoint detector, to group the extracted keypoints by referring to the part affinity field, and thus to generate body parts per the passengers, and as a result, allow the body recognition network to output multiple pieces of body-part length information on each of the passengers by referring to the body parts per the passengers.

As one example, the feature extraction network includes at least one convolutional layer and applies at least one convolution operation to the interior image, to thereby output the feature tensors.

As one example, the keypoint heatmap & part affinity field extractor includes one of a fully convolutional network and a 1×1 convolutional layer, and applies a fully-convolution operation or 1×1 convolution operation to the feature tensors, to thereby generate the keypoint heatmap and the part affinity field.

As one example, the keypoint detector connects, by referring to the part affinity field, pairs respectively having highest mutual connection probabilities of being connected among the extracted keypoints, to thereby group the extracted keypoints.

As one example, the feature extraction network and the keypoint heatmap & part affinity field extractor have been learned by a learning device performing (i) a process of inputting at least one training image including one or more objects for training into the feature extraction network, to thereby allow the feature extraction network to generate one or more feature tensors for training having one or more channels by applying at least one convolutional operation to the training image, (ii) a process of inputting the feature tensors for training into the keypoint heatmap & part affinity field extractor, to thereby allow the keypoint heatmap & part affinity field extractor to generate one or more keypoint heatmaps for training and one or more part affinity fields for training having one or more channels for each of the feature tensors for training, (iii) a process of inputting the keypoint heatmaps for training and the part affinity fields for training into the keypoint detector, to thereby allow the keypoint detector to extract keypoints for training from each of the keypoint heatmaps for training and a process of grouping the extracted keypoints for training by referring to each of the part affinity fields for training, to thereby detect keypoints per each of the objects for training, and (iv) a process of allowing a loss layer to calculate one or more losses by referring to the keypoints per each of the objects for training and their corresponding ground truths, to thereby adjust one or more parameters of the feature extraction network and the keypoint heatmap & part affinity field extractor such that the losses are minimized by backpropagation using the losses.

As one example, at the process of (I), the processor performs a process of inputting the interior image into the face recognition network, to thereby allow the face recognition network to detect each of the faces of each of the passengers located in the interior image via a face detector, and to output multiple pieces of the passenger feature information on each of the facial images via a facial feature classifier.

As one example, at the process of (I), the processor performs a process of inputting the interior image into the face recognition network, to thereby allow the face recognition network to (i) apply at least one convolution operation to the interior image and thus to output at least one feature map corresponding to the interior image via at least one convolutional layer, (ii) output one or more proposal boxes, where the passengers are estimated as located, on the feature map, via a region proposal network, (iii) apply pooling operation to one or more regions, corresponding to the proposal boxes, on the feature map and thus to output at least one feature vector via a pooling layer, and (iv) apply fully-connected operation to the feature vector, and thus to output the multiple pieces of the passenger feature information corresponding to each of the faces of each of the passengers corresponding to each of the proposal boxes via a fully connected layer.

As one example, the multiple pieces of the passenger feature information include each of ages, each of genders and each of races corresponding to each of the passengers.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure.

These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

Figure 1:
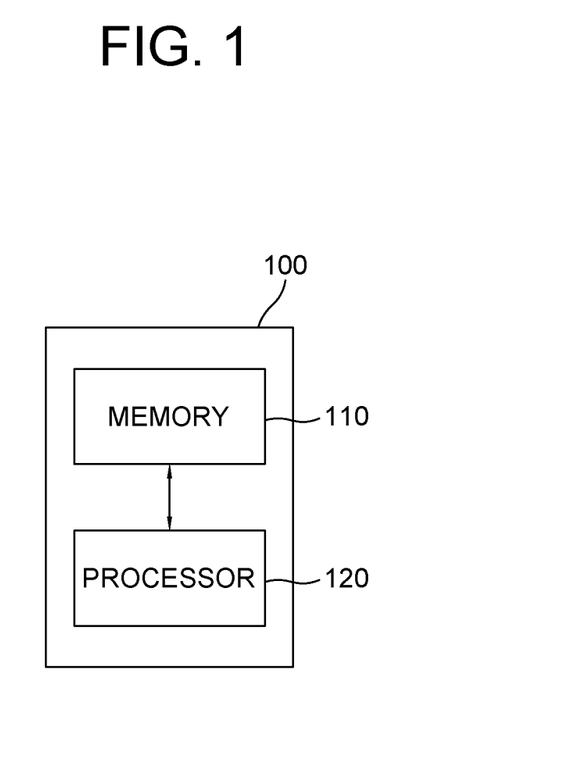
FIG. 1 is a drawing schematically illustrating a passenger body information-detecting device for detecting body information on one or more passengers of a vehicle by using body-part lengths and face recognition of the passengers based on humans' status recognition in accordance with one example embodiment of the present disclosure.

FIG. 1 is a drawing schematically illustrating a passenger body information-detecting device for detecting body information on one or more passengers of a vehicle by using body-part lengths and face recognition of the passengers based on humans' status recognition in accordance with one example embodiment of the present disclosure. By referring to FIG. 1, the passenger body information-detecting device 100 may include a memory 110 for storing instructions to detect the body information on the passengers of the vehicle by using the body-part lengths and the face recognition of the passengers based on the humans' status recognition, and a processor 120 for performing processes to detect the body information on the passengers of the vehicle by using the body-part lengths and the face recognition of the passengers based on the humans' status recognition according to the instructions in the memory 110.

Specifically, the passenger body information-detecting device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 2:
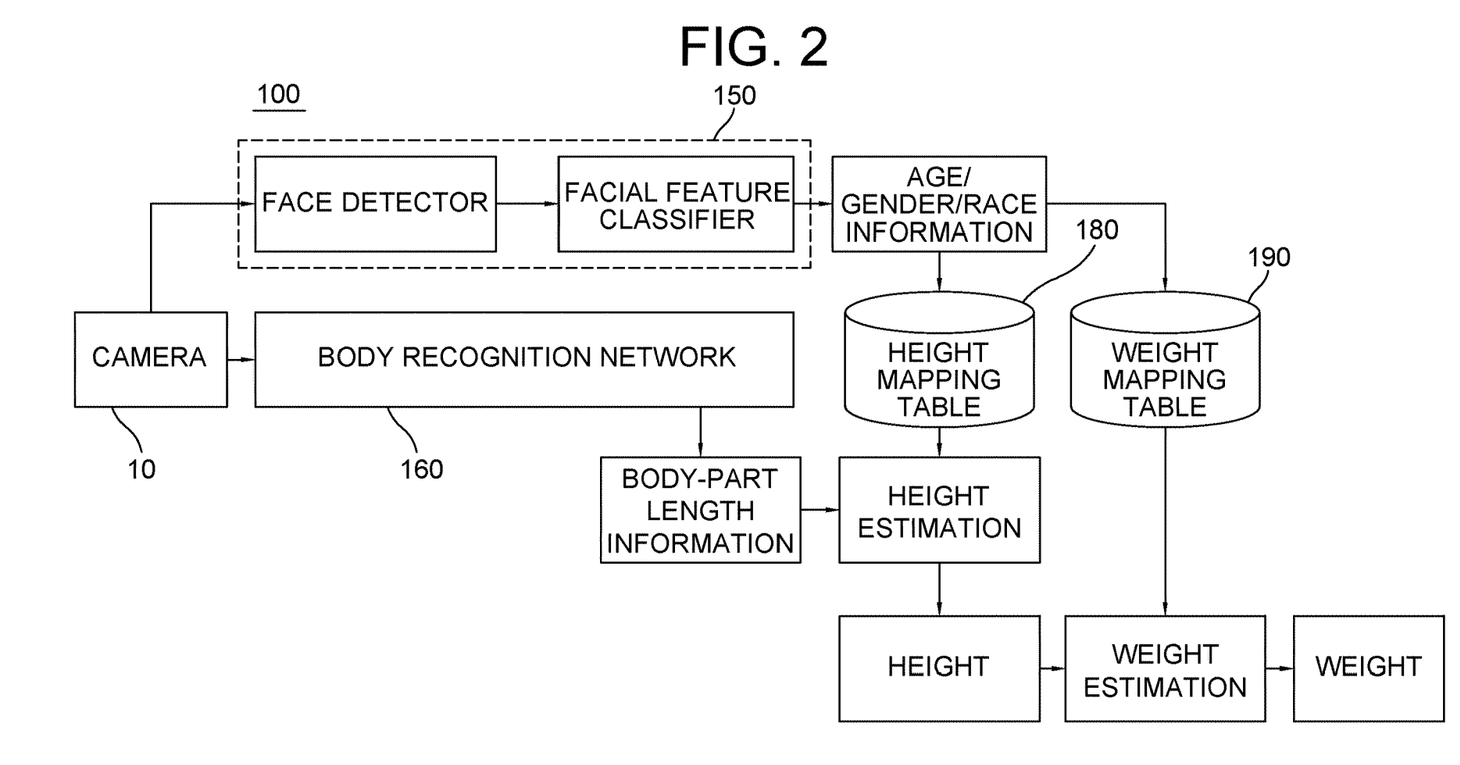
FIG. 2 is a drawing schematically illustrating a method for detecting the body information on the passengers of the vehicle by using the body-part lengths and the face recognition of the passengers based on the humans' status recognition in accordance with one example embodiment of the present disclosure.

A method for detecting the body information on the passengers of the vehicle via the body-part lengths and the face recognition of the passengers based on the humans' status recognition by using the passenger body information-detecting device 100 in accordance with one example embodiment of the present disclosure is described by referring to FIG. 2 as follows.

First, if at least one interior image of an interior of the vehicle is acquired, the passenger body information-detecting device 100 may input the interior image of the vehicle into a face recognition network 150, to thereby allow the face recognition network 150 to detect each of faces of each of the passengers from the interior image, and thus to output multiple pieces of passenger feature information corresponding to each of the detected faces. Herein, the multiple pieces of the passenger feature information may include each of ages, each of genders and each of races corresponding to each of the passengers.

Meanwhile, the face recognition network 150 may be implemented with various algorithms.

As one example, the face recognition network 150 may be implemented with a face detector and a facial feature classifier.

Herein, the passenger body information-detecting device 100 may perform a process of inputting the interior image into the face recognition network 150, to thereby allow the face recognition network 150 to detect each of the faces of each of the passengers located in the interior image via the face detector, and to output multiple pieces of the passenger feature information on each of the facial images via the facial feature classifier.

As another example, the face recognition network 150 may be implemented with an R-CNN.

Herein, the passenger body information-detecting device 100 may perform a process of inputting the interior image into the face recognition network 150, to thereby allow the face recognition network 150 to (i) apply at least one convolution operation to the interior image and thus to output at least one feature map corresponding to the interior image via at least one convolutional layer, (ii) output one or more proposal boxes, where the passengers are estimated as located, on the feature map, via a region proposal network, (iii) apply pooling operation to one or more regions, corresponding to the proposal boxes, on the feature map and thus to output at least one feature vector via a pooling layer, and (iv) apply fully-connected operation to the feature vector, and thus to output the multiple pieces of the passenger feature information corresponding to each of the faces of each of the passengers corresponding to each of the proposal boxes via a fully connected layer.

As still another example, the face recognition network 150 may be implemented with various neural networks adopting various algorithms, and each of the neural networks may have been learned beforehand.

Also, the passenger body information-detecting device 100 may input the interior image of the vehicle into a body recognition network 160, to thereby allow the body recognition network 160 to detect each of bodies of each of the passengers from the interior image, and thus to output body-part length information on the detected bodies. Herein, the body recognition network 160 may include an open-pose detector.

Figure 3:
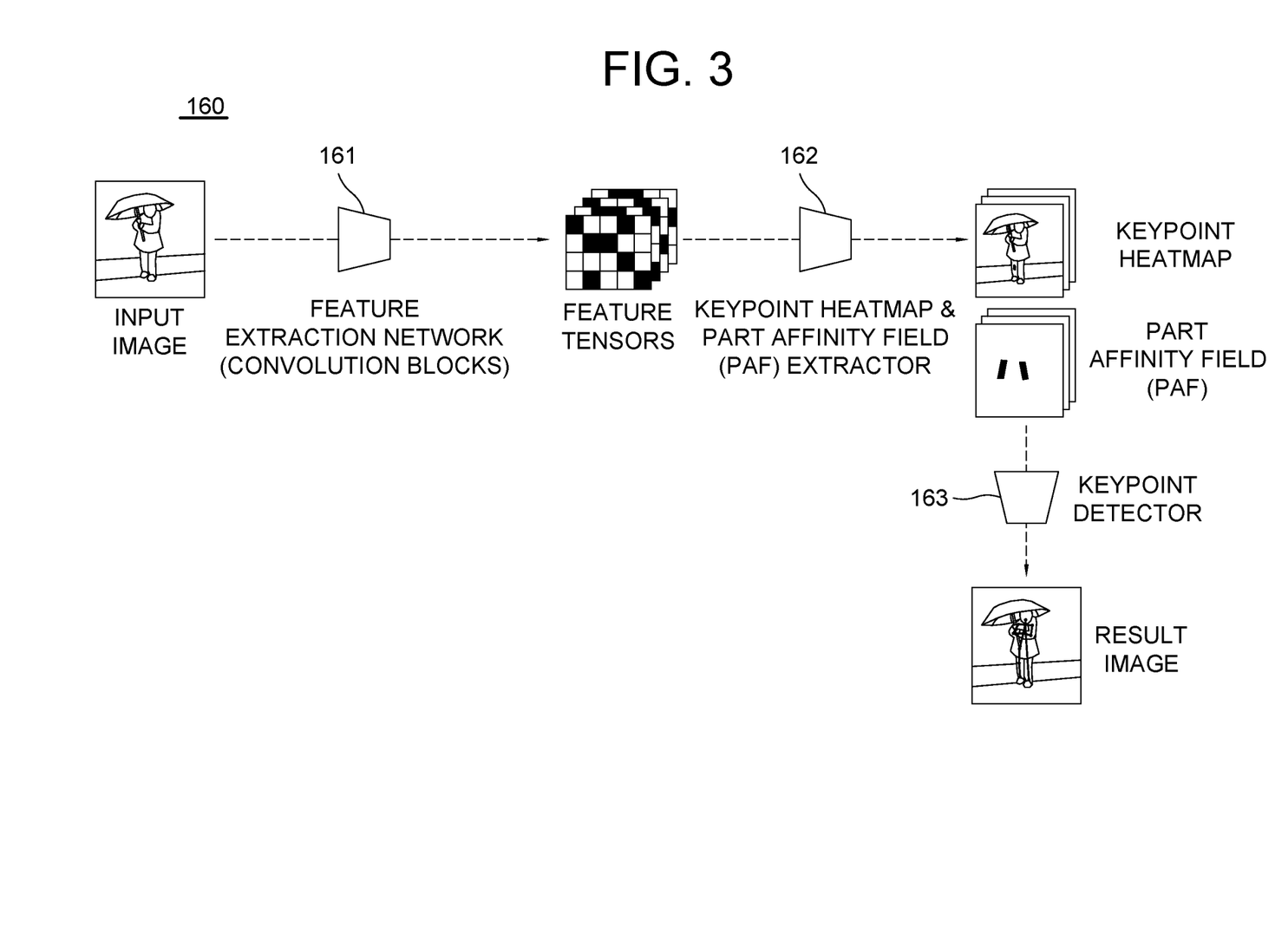
FIG. 3 is a drawing schematically illustrating a process of detecting one or more keypoints of the passengers in the method for detecting the body information on the passengers of the vehicle by using the body-part lengths and the face recognition of the passengers based on the humans' status recognition in accordance with one example embodiment of the present disclosure.

As one example, by referring to FIG. 3, the body recognition network 160 may instruct the feature extraction network 161 to output one or more feature tensors with one or more channels corresponding to the interior image which is an input image. Herein, the feature extraction network 161 may be one or more convolution blocks including at least one convolutional layer, and may apply at least one convolution operation to the interior image, to thereby generate the feature tensors.

And, the body recognition network 160 may input the feature tensors into a keypoint heatmap & part affinity field extractor 162, to thereby instruct the keypoint heatmap & part affinity field extractor 162 to generate at least one keypoint heatmap with the channels and at least one part affinity field with the channels corresponding to the feature tensors. Also, the keypoint heatmap & part affinity field extractor 162 may detect relations among the keypoints by using a bipartite matching, to thereby generate the part affinity field. That is, it may be confirmed by the bipartite matching that which keypoints belong to which passengers, and that what the relations among the keypoints are.

Herein, a meaning of the "heatmap" may represent a combination of heat and a map, which may graphically show various information that can be expressed by colors as heat-like distribution on an image. And, the part affinity field may be a vector map representing the relations among the keypoints in each of the channels of the keypoint heatmap. That is, the part affinity field may be a map showing connections of a specific keypoint with other keypoints, and may be a map representing each of mutual connection probabilities of each of the keypoints in each of keypoint heatmap pairs.

And, the keypoint heatmap & part affinity field extractor 162 may include one of a fully convolutional network and one or more 1×1 convolutional layers, and may apply fully-convolution operation or 1×1 convolution operation to the feature tensors, to thereby generate the keypoint heatmap and the part affinity field.

Next, the body recognition network 160 may input the keypoint heatmap and the part affinity field into the keypoint detector 163, to thereby allow the keypoint detector 163 to extract the keypoints from each of the channels of the keypoint heatmap, and to group the extracted keypoints by referring to the part affinity field. That is, by referring to the connection probabilities, two of the keypoints with their highest probabilities may be paired. Herein, the keypoint detector may extract each of highest points in each of keypoint heatmaps corresponding to each channel, that is, each of points having the highest heat value, as each of the keypoints corresponding to each of the keypoint heatmaps, may pair the keypoints, respectively having their own corresponding highest probabilities of being connected to each other among the extracted keypoints, to thereby group the extracted keypoints by referring to the part affinity fields, and the grouped keypoints may be the body parts of each of the passengers. As one example, a process of connecting a first keypoint among the extracted keypoints and a second keypoint among the extracted keypoints as a pair may be performed if the second keypoint is determined as having its corresponding highest probability of being connected to the first keypoint among the extracted keypoints. Herein, such a process may be performed with respect to all the extracted keypoints. Then, as a result, the extracted keypoints may be classified into one or more groups. Herein, the number of the groups may be determined according to the number of the passengers in the interior image.

Figure 4:
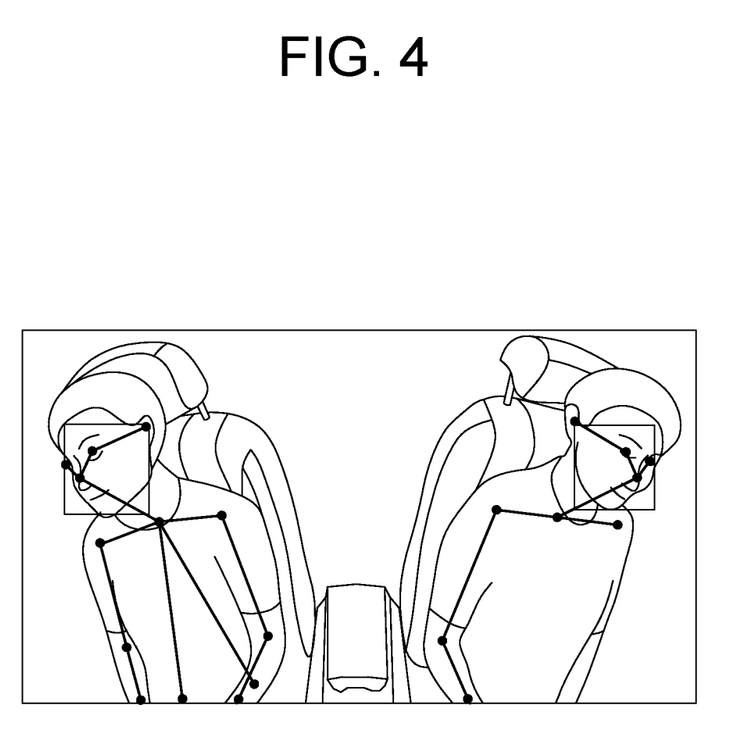
FIG. 4 is a drawing schematically illustrating a process of detecting the body-part lengths of the passengers in the method for detecting the body information on the passengers of the vehicle by using the body-part lengths and the face recognition of the passengers based on the humans' status recognition in accordance with one example embodiment of the present disclosure.

And, by referring to FIG. 4, the body recognition network 160 may output the body-part length information by referring to one or more body parts corresponding to the each of the passengers. As one example, the body-part length information may include lengths of arms, widths of shoulders, etc. of the passengers.

Meanwhile, the feature extraction network 161 and the keypoint heatmap & part affinity field extractor 162 of the body recognition network 160 may have been learned by a learning device beforehand.

As one example, if at least one training image including at least one object for training is acquired, the learning device may input the training image into the feature extraction network 161, to thereby allow the feature extraction network 161 to apply at least one convolution operation to the training image, and thus to generate one or more feature tensors for training with one or more channels. And, the learning device may perform (i) a process of inputting the feature tensors for training into the keypoint heatmap & part affinity field extractor 162, to thereby allow the keypoint heatmap & part affinity field extractor 162 to generate one or more keypoint heatmaps for training and one or more part affinity fields for training having one or more channels corresponding to each of the feature tensors for training, and (ii) a process of inputting the keypoint heatmaps for training and the part affinity fields for training into the keypoint detector 163, to thereby allow the keypoint detector 163 to extract one or more keypoints for training from each of the keypoint heatmaps for training and a process of grouping the extracted keypoints for training by referring to each of the part affinity fields for training, to thereby detect the keypoints per each of the objects for training. Thereafter, the learning device may instruct a loss layer to calculate one or more losses by referring to the keypoints per the object for training and their corresponding ground truths, and adjust one or more parameters of the feature extraction network 161 and the keypoint heatmap & part affinity field extractor 162 such that the losses are minimized by backpropagation using the losses, to thereby learn the feature extraction network 161 and the keypoint heatmap & part affinity field extractor 162.

Next, by referring to FIG. 2 again, the passenger body information-detecting device 100 may acquire height mapping information on the detected passengers corresponding to the age/gender/race information on each of the detected passengers by referring to the height mapping table 180.

Figure 5:
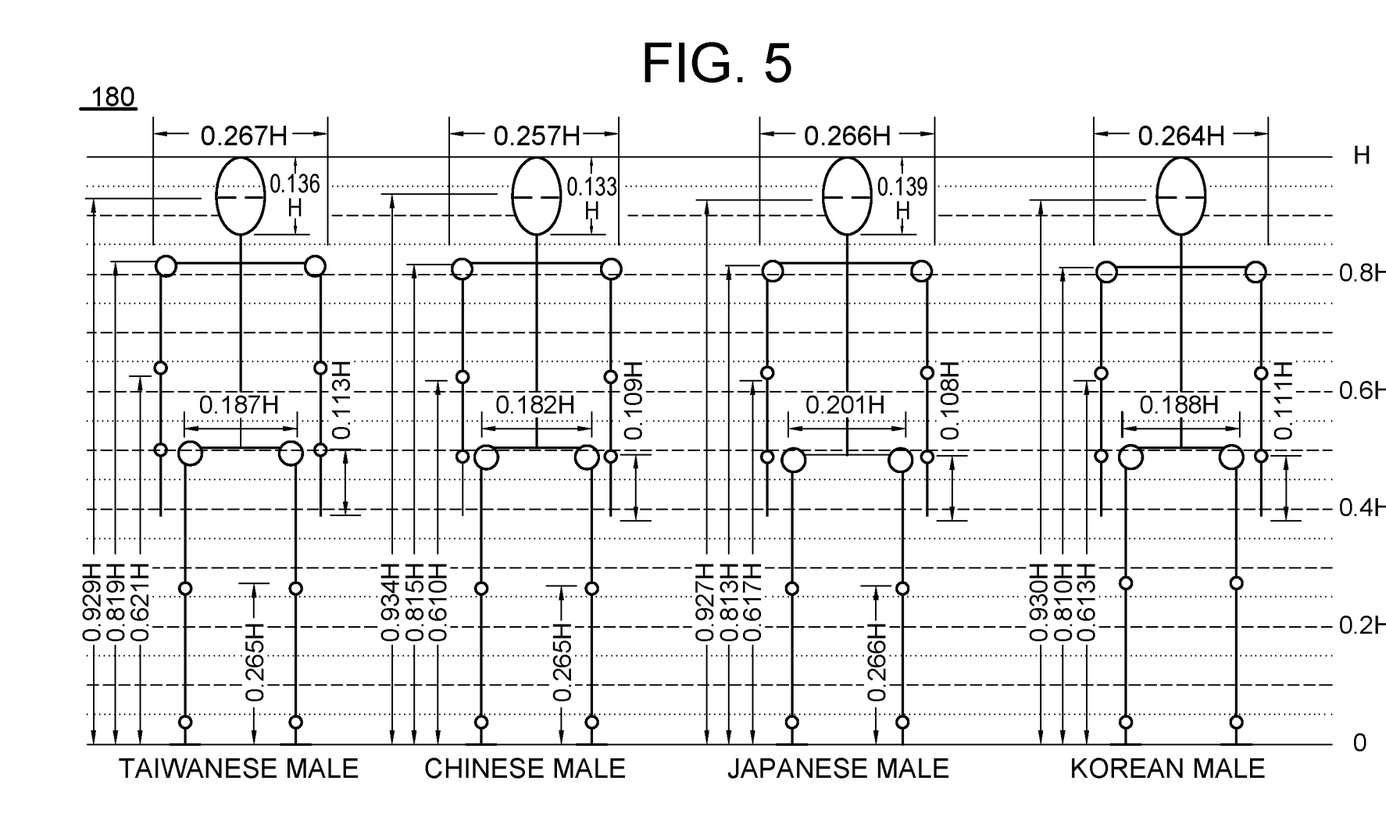
FIG. 5 is a drawing schematically illustrating a height mapping table to be used in the method for detecting the body information on the passengers of the vehicle by using the body-part lengths and the face recognition of the passengers based on the humans' status recognition in accordance with one example embodiment of the present disclosure.

Herein, by referring to FIG. 5, the height mapping table 180 may include the height mapping information including graphical representation of one or more predetermined ratios of (i) one or more segment body portions of each of human groups to (ii) each of heights per each of the human groups. Herein, the human groups may be groups into which humans are grouped by the ages/genders/races. And, as in 'The comparisons of anthropometric characteristics among four peoples in East Asia, Applied Ergonomics, 2004', the height mapping table may utilize data created by statistically analyzing correlations between the heights and the body-part lengths per the race/gender/age.

And, the passenger body information-detecting device 100 may perform height estimation by referring to the height mapping information and the body-part length information corresponding to each of the passengers, to thereby detect each of the heights of each of the passengers.

That is, the passenger body information-detecting device 100 may acquire specific height mapping information corresponding to specific passenger feature information on a specific passenger from the height mapping table 180, and may acquire a specific height of the specific passenger from the specific height mapping information by referring to specific body-part length information on the specific passenger.

Next, the passenger body information-detecting device 100 may acquire weight mapping information on the passengers corresponding to the age/gender/race information on each of the detected passengers by referring to the weight mapping table 190. Herein, the weight mapping table 190 may utilize data created by statistically analyzing correlations between the heights and the weights per the race/gender/age.

Thereafter, the passenger body information-detecting device 100 may perform weight estimation by referring to multiple pieces of weight mapping information and information on the heights corresponding to each of the passengers, to thereby detect each of the weights of each of the passengers.

That is, the passenger body information-detecting device 100 may acquire specific weight mapping information corresponding to the specific passenger feature information from the weight mapping table 190, and may acquire a specific weight of the specific passenger from the specific weight mapping information by referring to the specific height of the specific passenger.

Therefore, by referring to the heights and the weights of the passengers detected by the passenger body information-detecting device 100, determination of whether one or more airbags should be deployed, and determination of direction and intensity of the deployment may be performed for each of the passengers. Also, beside the deployment of the airbags, various safety devices and convenience devices of the vehicle may be operated by referring to the heights and the weights of the detected passengers.

Also, the passenger body information-detecting device 100 may match each of the keypoints with the seats, to thereby detect occupancy for each of the seats of the vehicle.

Figure 6:
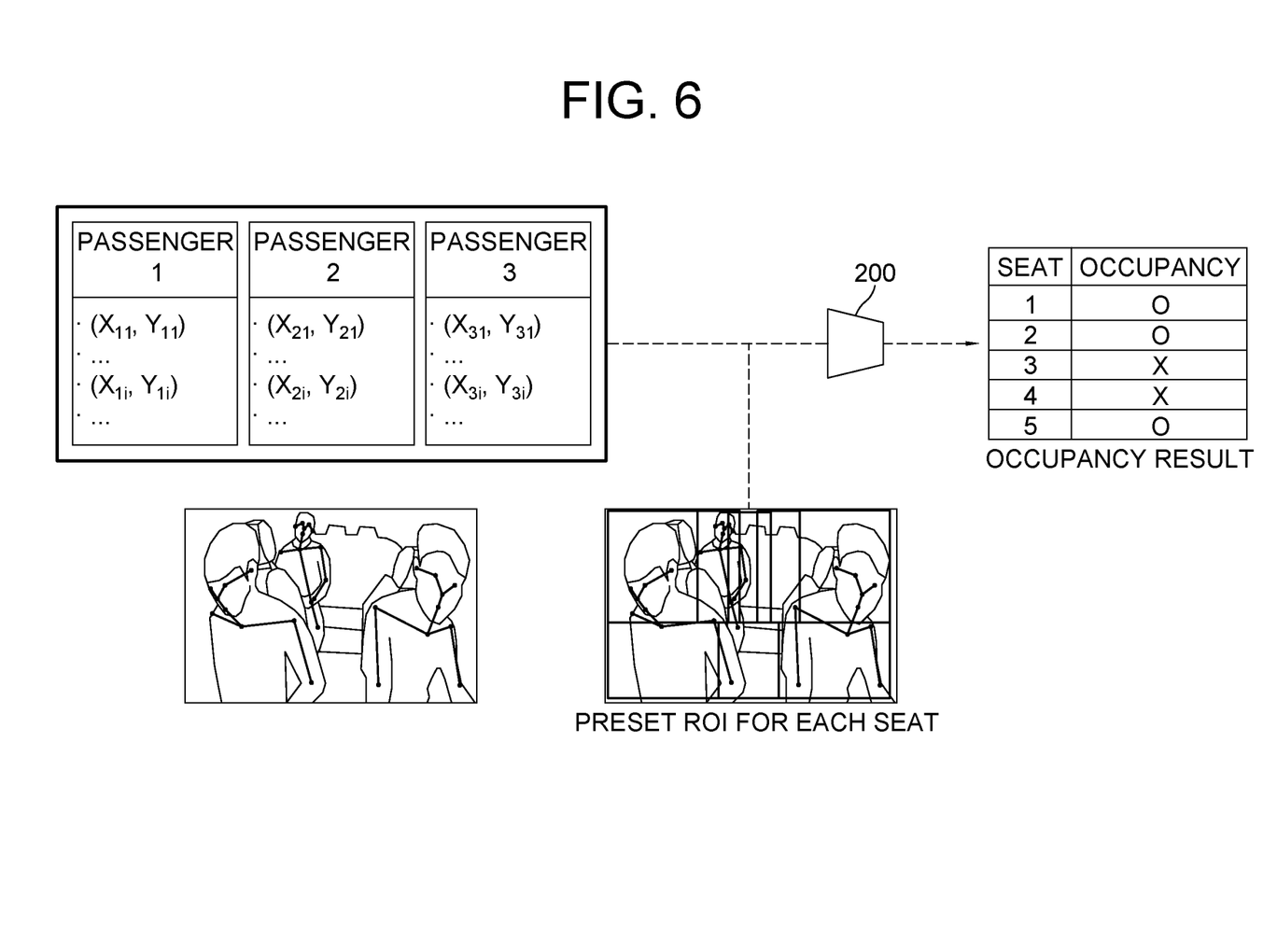
FIG. 6 is a drawing schematically illustrating a process of matching the keypoints of the passengers with one or more seats of the vehicle in the method for detecting the body information on the passengers of the vehicle by using the body-part lengths and the face recognition of the passengers based on the humans' status recognition in accordance with one example embodiment of the present disclosure.

As one example, by referring to FIG. 6, the passenger body information-detecting device 100 may input or support another device to input the keypoints per the passengers, i.e., coordinate information on the keypoints, into a seat occupation matcher 200.

Then, the seat occupation matcher 200 may calculate each of means and each of variances of the keypoints, for example, a mean and a variance of the keypoints of a head and a body, corresponding to each of the passengers.

And, the seat occupation matcher 200 may match each of the passengers with each of the seats by referring to (i) each of the means corresponding to each of the passengers and (ii) each of the variances corresponding to said each of the passengers, for each of the preset ROIs for each of the seats.

That is, supposing that the keypoints for each of the passengers belong to each of keypoint groups of each of the passengers, then for a specific ROI predefined corresponding to a specific seat, whether a specific mean point of a specific keypoint group corresponding to the specific passenger is located in the specific ROI may be determined. Herein, if the specific mean point is determined as not located in the specific ROI, then it may be determined that the specific passenger does not match the specific seat.

Also, whether a specific variance of the specific keypoint group is equal to or less than a first prescribed threshold may be determined. Herein, the first prescribed threshold may be used for excluding misdetected keypoints, and if the specific variance is determined as greater than the first prescribed threshold then it may be determined that the specific passenger does not match the specific seat.

And, whether the number of the specific keypoints of the specific keypoint group in the specific ROI is equal to or greater than a second prescribed threshold may be determined. Herein, the second prescribed threshold may be used for excluding misdetected keypoints, and if the number of the specific keypoints of the specific keypoint group in the specific ROI is determined as less than the second prescribed threshold then it may be determined that the specific passenger does not match the specific seat.

Therefore, in case that the specific mean point is located in the specific ROI, that the specific variance is equal to or less than the first prescribed threshold, and that the number of the specific keypoints of the specific keypoint group in the specific ROI is equal to or greater than the second prescribed threshold, the seat occupation matcher 200 may determine that the specific passenger matches the specific seat.

As a result, when the airbags of the vehicle are deployed, accurate deployment may be possible by referring to the heights, the weights, and the seats of the detected passengers.

As described above, the present disclosure, based on humans status recognition, estimates the ages/genders/races of each of the passengers from face information of the passengers using the interior image of the vehicle acquired from the camera, measures body-part lengths of the passengers using human body recognition, and detects the heights of the weights of the passengers by referring to information on the passengers. And, the present disclosure reduces costs, is independent of the surroundings of the vehicle, and improves processing speed, compared to conventional methods using the sensors.

The present disclosure has an effect of reducing the costs by detecting the heights and the weights of the passengers through analyzing the interior image of the vehicle taken by the camera, compared to the conventional methods using the sensors. The present disclosure has another effect of detecting the heights and the weights of the passengers without regard to the surroundings of the vehicle because the heights and the weights of the passengers are detected by analyzing the interior image of the vehicle taken by the camera.

The present disclosure has still another effect of improving the processing speed since information to be processed is less than that of the conventional methods using the sensors by detecting the heights and the weights of the passengers through analyzing the interior image of the vehicle taken by the camera.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting body information on one or more passengers of a vehicle based on humans' status recognition, comprising steps of:

(a) if at least one interior image of an interior of the vehicle is acquired, a passenger body information-detecting device performing (i) a process of inputting the interior image into a face recognition network, to thereby allow the face recognition network to detect each of faces of each of the passengers from the interior image, and thus to output multiple pieces of passenger feature information corresponding to each of the detected faces, and (ii) a process of inputting the interior image into a body recognition network, to thereby allow the body recognition network to detect each of bodies of each of the passengers from the interior image, and thus to output body-part length information of each of the detected bodies; and (b) the passenger body information-detecting device performing a process of retrieving specific height mapping information corresponding to specific passenger feature information on a specific passenger from a height mapping table which stores height mapping information representing respective one or more predetermined ratios of one or more segment body portions of each of human groups to each of heights per each of the human groups, a process of acquiring a specific height of the specific passenger from the specific height mapping information by referring to specific body-part length information of the specific passenger, a process of retrieving specific weight mapping information corresponding to the specific passenger feature information from a weight mapping table which stores multiple pieces of weight mapping information representing predetermined correlations between each of the heights and each of weights per each of the human groups, and a process of acquiring a weight of the specific passenger from the specific weight mapping information by referring to the specific height of the specific passenger.

2. The method of claim 1, wherein, at the step of (a), the passenger body information-detecting device performs a process of inputting the interior image into the body recognition network, to thereby allow the body recognition network to (i) output one or more feature tensors with one or more channels corresponding to the interior image via a feature extraction network, (ii) generate at least one keypoint heatmap and at least one part affinity field with one or more channels corresponding to each of the feature tensors via a keypoint heatmap and part affinity field extractor, and (iii) extract keypoints from the keypoint heatmap via a keypoint detector, to group the extracted keypoints by referring to the part affinity field, and thus to generate body parts per the passengers, and as a result, allow the body recognition network to output multiple pieces of body-part length information on each of the passengers by referring to the body parts per the passengers.

3. The method of claim 2, wherein the feature extraction network includes at least one convolutional layer and applies at least one convolution operation to the interior image, to thereby output the feature tensors.

4. The method of claim 2, wherein the keypoint heatmap and part affinity field extractor includes one of a fully convolutional network and a 1×1 convolutional layer, and applies a fully-convolution operation or 1×1 convolution operation to the feature tensors, to thereby generate the keypoint heatmap and the part affinity field.

5. The method of claim 2, wherein the keypoint detector connects, by referring to the part affinity field, pairs respectively having highest mutual connection probabilities of being connected among the extracted keypoints, to thereby group the extracted keypoints.

6. The method of claim 2, wherein the feature extraction network and the keypoint heatmap and part affinity field extractor have been learned by a learning device performing (i) a process of inputting at least one training image including one or more objects for training into the feature extraction network, to thereby allow the feature extraction network to generate one or more feature tensors for training having one or more channels by applying at least one convolutional operation to the training image, (ii) a process of inputting the feature tensors for training into the keypoint heatmap and part affinity field extractor, to thereby allow the keypoint heatmap and part affinity field extractor to generate one or more keypoint heatmaps for training and one or more part affinity fields for training having one or more channels for each of the feature tensors for training, (iii) a process of inputting the keypoint heatmaps for training and the part affinity fields for training into the keypoint detector, to thereby allow the keypoint detector to extract keypoints for training from each of the keypoint heatmaps for training and a process of grouping the extracted keypoints for training by referring to each of the part affinity fields for training, to thereby detect keypoints per each of the objects for training, and (iv) a process of allowing a loss layer to calculate one or more losses by referring to the keypoints per each of the objects for training and their corresponding ground truths, to thereby adjust one or more parameters of the feature extraction network and the keypoint heatmap and part affinity field extractor such that the losses are minimized by backpropagation using the losses.

7. The method of claim 1, wherein, at the step of (a), the passenger body information-detecting device performs a process of inputting the interior image into the face recognition network, to thereby allow the face recognition network to detect each of the faces of each of the passengers located in the interior image via a face detector, and to output multiple pieces of the passenger feature information on each of the facial images via a facial feature classifier.

8. The method of claim 1, wherein, at the step of (a), the passenger body information-detecting device performs a process of inputting the interior image into the face recognition network, to thereby allow the face recognition network to (i) apply at least one convolution operation to the interior image and thus to output at least one feature map corresponding to the interior image via at least one convolutional layer, (ii) output one or more proposal boxes, where the passengers are estimated as located, on the feature map, via a region proposal network, (iii) apply pooling operation to one or more regions, corresponding to the proposal boxes, on the feature map and thus to output at least one feature vector via a pooling layer, and (iv) apply fully-connected operation to the feature vector, and thus to output the multiple pieces of the passenger feature information corresponding to each of the faces of each of the passengers corresponding to each of the proposal boxes via a fully connected layer.

9. The method of claim 1, wherein the multiple pieces of the passenger feature information include each of ages, each of genders and each of races corresponding to each of the passengers.

10. A passenger body information-detecting device for detecting body information on one or more passengers of a vehicle based on humans' status recognition, comprising:
at least one memory that stores instructions; and
at least one processor configured to execute the instructions to perform or support another device to perform: (I) if at least one interior image of an interior of the vehicle is acquired, (i) a process of inputting the interior image into a face recognition network, to thereby allow the face recognition network to detect each of faces of each of the passengers from the interior image, and thus to output multiple pieces of passenger feature information corresponding to each of the detected faces, and (ii) a process of inputting the interior image into a body recognition network, to thereby allow the body recognition network to detect each of bodies of each of the passengers from the interior image, and thus to output body-part length information of each of the detected bodies, and (II) a process of retrieving specific height mapping information corresponding to specific passenger feature information on a specific passenger from a height mapping table which stores height mapping information representing respective one or more predetermined ratios of one or more segment body portions of each of human groups to each of heights per each of the human groups, a process of acquiring a specific height of the specific passenger from the specific height mapping information by referring to specific body-part length information of the specific passenger, a process of retrieving specific weight mapping information corresponding to the specific passenger feature information from a weight mapping table which stores multiple pieces of weight mapping information representing predetermined correlations between each of the heights and each of weights per each of the human groups, and a process of acquiring a weight of the specific passenger from the specific weight mapping information by referring to the specific height of the specific passenger.

11. The passenger body information-detecting device of claim 10, wherein, at the process of (I), the processor performs a process of inputting the interior image into the body recognition network, to thereby allow the body recognition network to (i) output one or more feature tensors with one or more channels corresponding to the interior image via a feature extraction network, (ii) generate at least one keypoint heatmap and at least one part affinity field with one or more channels corresponding to each of the feature tensors via a keypoint heatmap and part affinity field extractor, and (iii) extract keypoints from the keypoint heatmap via a keypoint detector, to group the extracted keypoints by referring to the part affinity field, and thus to generate body parts per the passengers, and as a result, allow the body recognition network to output multiple pieces of body-part length information on each of the passengers by referring to the body parts per the passengers.

12. The passenger body information-detecting device of claim 11, wherein the feature extraction network includes at least one convolutional layer and applies at least one convolution operation to the interior image, to thereby output the feature tensors.

13. The passenger body information-detecting device of claim 11, wherein the keypoint heatmap and part affinity field extractor includes one of a fully convolutional network and a 1×1 convolutional layer, and applies a fully-convolution operation or 1×1 convolution operation to the feature tensors, to thereby generate the keypoint heatmap and the part affinity field.

14. The passenger body information-detecting device of claim 11, wherein the keypoint detector connects, by referring to the part affinity field, pairs respectively having highest mutual connection probabilities of being connected among the extracted keypoints, to thereby group the extracted keypoints.

15. The passenger body information-detecting device of claim 11, wherein the feature extraction network and the keypoint heatmap and part affinity field extractor have been learned by a learning device performing (i) a process of inputting at least one training image including one or more objects for training into the feature extraction network, to thereby allow the feature extraction network to generate one or more feature tensors for training having one or more channels by applying at least one convolutional operation to the training image, (ii) a process of inputting the feature tensors for training into the keypoint heatmap and part affinity field extractor, to thereby allow the keypoint heatmap and part affinity field extractor to generate one or more keypoint heatmaps for training and one or more part affinity fields for training having one or more channels for each of the feature tensors for training, (iii) a process of inputting the keypoint heatmaps for training and the part affinity fields for training into the keypoint detector, to thereby allow the keypoint detector to extract keypoints for training from each of the keypoint heatmaps for training and a process of grouping the extracted keypoints for training by referring to each of the part affinity fields for training, to thereby detect keypoints per each of the objects for training, and (iv) a process of allowing a loss layer to calculate one or more losses by referring to the keypoints per each of the objects for training and their corresponding ground truths, to thereby adjust one or more parameters of the feature extraction network and the keypoint heatmap and part affinity field extractor such that the losses are minimized by backpropagation using the losses.

16. The passenger body information-detecting device of claim 10, wherein, at the process of (I), the processor performs a process of inputting the interior image into the face recognition network, to thereby allow the face recognition network to detect each of the faces of each of the passengers located in the interior image via a face detector, and to output multiple pieces of the passenger feature information on each of the facial images via a facial feature classifier.

17. The passenger body information-detecting device of claim 10, wherein, at the process of (I), the processor performs a process of inputting the interior image into the face recognition network, to thereby allow the face recognition network to (i) apply at least one convolution operation to the interior image and thus to output at least one feature map corresponding to the interior image via at least one convolutional layer, (ii) output one or more proposal boxes, where the passengers are estimated as located, on the feature map, via a region proposal network, (iii) apply pooling operation to one or more regions, corresponding to the proposal boxes, on the feature map and thus to output at least one feature vector via a pooling layer, and (iv) apply fully-connected operation to the feature vector, and thus to output the multiple pieces of the passenger feature information corresponding to each of the faces of each of the passengers corresponding to each of the proposal boxes via a fully connected layer.

18. The passenger body information-detecting device of claim 10, wherein the multiple pieces of the passenger feature information include each of ages, each of genders and each of races corresponding to each of the passengers.

\* \* \* \* \*